(12) United States Patent
Cauvin et al.

(10) Patent No.: US 8,958,518 B2
(45) Date of Patent: Feb. 17, 2015

(54) DEVICE FOR INSPECTING A FUEL ROD ASSEMBLY IN THE POOL OF A NUCLEAR PLANT AND CORRESPONDING INSPECTION METHOD

(75) Inventors: Richard Cauvin, Benais (FR); Denis Tessier, Amilly (FR)

(73) Assignee: Electricite de France (FR)

( * ) Notice: Subject to any disclaimer, the term of this patent is extended or adjusted under 35 U.S.C. 154(b) by 737 days.

(21) Appl. No.: 12/682,145

(22) PCT Filed: Oct. 7, 2008

(86) PCT No.: PCT/EP2008/063414
§ 371 (c)(1),
(2), (4) Date: Aug. 13, 2010

(87) PCT Pub. No.: WO2009/047256
PCT Pub. Date: Apr. 16, 2009

(65) Prior Publication Data
US 2010/0303189 A1 Dec. 2, 2010

(30) Foreign Application Priority Data

Oct. 8, 2007 (FR) .................................. 07 58144

(51) Int. Cl.
*G21C 17/00* (2006.01)
*G21C 17/06* (2006.01)
*G21C 17/007* (2006.01)

(52) U.S. Cl.
CPC .............. *G21C 17/06* (2013.01); *G21C 17/007* (2013.01); *G21Y 2002/202* (2013.01); *G21Y 2002/301* (2013.01); *G21Y 2002/304* (2013.01); *G21Y 2004/30* (2013.01); *G21Y 2004/40* (2013.01)
USPC ........................................................ 376/245

(58) Field of Classification Search
CPC ........ G21C 5/25; G21C 17/007; G21C 17/06; G21Y 2002/202; G21Y 2002/301; G21Y 2002/304; G21Y 2004/40; G21Y 2004/20
USPC .......................................................... 376/245
See application file for complete search history.

(56) References Cited

U.S. PATENT DOCUMENTS 3,621,580 A * 11/1971 Tovaglieri ...................... 33/555
4,193,843 A * 3/1980 Womack et al. .............. 376/252

(Continued)

FOREIGN PATENT DOCUMENTS

| EP | 0123597 A1 | 10/1984 |
|----|------------|---------|
| FR | 2601180 A1 | 1/1988 |
| JP | 02259401 A | 10/1990 |

OTHER PUBLICATIONS

International Search Report PCT/EP2008/063414, dated Jan. 29, 2009 and French Preliminary Search Report.

*Primary Examiner* — Frank J McGue
(74) *Attorney, Agent, or Firm* — Lerner, David, Littenberg, Krumholz & Mentlik, LLP

(57) ABSTRACT

The invention relates to a device for inspecting a fuel assembly in the pool of a nuclear plant, that comprises an image sensor with an observation field, and further comprising a boom with at least one removable fastener to the assembly, a reference graduation extending along an axis parallel to a longitudinal axis of the assembly, so that the image sensor can monitor within its field both the boom and the assembly. The device is designed so that the boom can be removably attached to the fuel assembly when the latter is suspended outside the pool by the hook of the machine for handling the fuel assemblies. The invention also relates to a corresponding method.

12 Claims, 2 Drawing Sheets

(56) References Cited

U.S. PATENT DOCUMENTS 4,336,103 A * 6/1982 Katscher et al. .............. 376/245
4,657,728 A * 4/1987 Coppa et al. .................. 376/248
4,728,483 A * 3/1988 Ahmed et al. ................ 376/258
4,988,475 A * 1/1991 Guironnet ..................... 376/248

* cited by examiner

DEVICE FOR INSPECTING A FUEL ROD ASSEMBLY IN THE POOL OF A NUCLEAR PLANT AND CORRESPONDING INSPECTION METHOD

CROSS-REFERENCE TO RELATED APPLICATIONS

The present application is a 35 U.S.C. §§371 national phase conversion of PCT/EP2008/063414, filed Oct. 7, 2008, which claims priority of French Application No. 0758144, filed Oct. 8, 2007, incorporated by reference herein. The PCT International Application was published in the French language.

BACKGROUND OF THE INVENTION

The present invention relates to a device for inspecting a fuel assembly in a pool of a nuclear plant equipped with a grapnel for displacing and suspending the assembly in the pool.

It also relates to an inspection method applying the device.

FIG. 1 schematically illustrates one of the racks 30 for storing assemblies 3 of fuel rods arranged in a storage pool 1 of a nuclear plant of the PWR (pressurized water reactor) type.

Each assembly 3 forms an elementary fuel unit and should be placed in a nuclear reactor in order to be able to produce energy. Each assembly 3 is formed with a series of supporting and separating grids, in which cylindrical rods containing pellets of enriched uranium oxide are positioned vertically. Each assembly generally has a square cross-section (with a side of about 200 mm) grouping, for PWR operated by EDF, 264 rods (geometry 17×17) and a height of the order of 4-5 m. End pieces 31 and 32 respectively form the top and the base of the assembly.

The racks 30, located at the bottom of the pool 1, include cells 34 with separating walls 33, so that no nuclear reaction occurs in the pool 1 when the assemblies 3 are placed in the racks 30. The so-called storage pool 1 forms a temporary storage lock for new assemblies 3 awaiting to be loaded into the nuclear reactor, and for spent assemblies awaiting removal (reprocessing, long period storage, etc.). The pool 1 is moreover filled with borated water 2, in order to avoid any nuclear reaction and any radiation towards the outside of the pool.

In order to displace the assemblies in the pool, for example for loading them into the reactor, or for unloading them from the reactor, or for examining them, a mobile grapnel 4, connected to a bridge 8 located above the pool, allows the assemblies 3 to be grasped by their top and to be taken out of the cells 34.

A lowerator 6 allows new assemblies to be put into the water. The lowerator 6 notably includes a basket 63, the length of which is generally at least equal to the length of an assembly 3, and in which an assembly is placed; this basket is mounted on a vertical rail 61 and actuated by a winch which allows it to be displaced along an axis Z parallel to a longitudinal axis of the assembly.

A transfer machine as for it allows transportation of the fuel assemblies from the reactor towards the pool 1 (and vice versa). A discharge ditch then allows transportation of the assemblies towards reprocessing plants.

In order to study or confirm the behavior under irradiation of the fuel assemblies, the possibility of inspecting the assemblies notably by metrology is desired.

FIG. 1 very schematically shows a known inspection device 10.

The device 10 is laid at the bottom of the pool or secured to the wall of the pool. It mainly includes a vertical enclosure 101 a little larger than the assembly, an enclosure open on one side in order to allow inspections. The fuel assembly is placed in this enclosure 101 by means of the bridge and of the grapnel 4. A video camera 102 mounted on the enclosure 101, may be displaced along the three axes (vertical 103, front/rear 105, left/right 104), in order to allow viewing of one face of the assembly. The camera is displaced by means of stepping motors 113, 114 and 115, the movement of which is indexed. A device placed at the bottom of the enclosure allows rotation of the assembly in order to allow successive examination of the four faces.

In order to carry out the inspection of an assembly, the assembly 3 is removed from a cell of the rack 30 by means of the bridge 8, and then the assembly 3 is placed in the enclosure 101. Measurements are carried out by displacing the camera 102 in the space in order to successively aim at both of the ends of each length to be measured; the indexation of the stepping motors has been calibrated beforehand on a standard with a reference length; the covered distance may therefore be inferred from the information given by the motors 113, 114 and 115.

EP 0 123 597 discloses an exemplary device, the operation principle of which is close to the known device described above.

The device of EP 0 123 597 includes means for supporting the assembly to be examined, means for examining the assembly, including a camera, and means for displacing the examination means.

Like for the device of FIG. 1, the fuel assembly should be mounted in the supporting means, prior to the measurements, for example by means of the grapnel already described.

The means for displacing the examination means include a mobile carriage, a column integral with the carriage, and a bracket vertically displaceable along the column. These specific displacement means are mounted in proximity to the supporting means.

Displacement counters are associated with the carriage and with the bracket in order to quantify the displacements of the camera.

Measurements require a preliminary step for calibrating the displacement counters. Calibration is carried out by observing with the camera a reference graduation attached on the supporting means in proximity to the assembly.

Once the displacement counters are calibrated, the measurement is conducted by successively aiming the camera at two ends of the length to be measured on the assembly: the displacement of the displacement means then provides the length to be measured.

Known devices of the state of the art however have drawbacks.

The known devices require the supply of specific additional pieces of equipment with respect to normal operation of the nuclear plant. These specific pieces of equipment are notably the enclosure 101 or the supporting means of EP 0 123 597, as well as the means for displacing the examination means. Such means may also be installed permanently, then requiring investment for each reactor.

Known devices are thus relatively bulky. Their presence in the pool may interfere with certain handling operations, such as removal of the used fuel for example.

The enclosure or the supporting means are moreover heavy. They have to be transported on the nuclear plant and installed in the pool for storing spent fuel. The transport and installation are costly operations which require significant time (one to two weeks).

Measurements take a long time, since the camera has to move in order to explore each of the components, the length of which is intended to be measured. The phase for calibrating the displacement counters also takes a long time.

The device includes a lot of elements and is not easy to decontaminate.

The cost of the device is further relatively high.

As the inspections are generally carried out during the renewal of the fuel, with a stopped reactor, the duration of the inspection may have a significant financial impact on the operating cost of the reactor.

BRIEF SUMMARY OF THE INVENTION

The invention proposes to overcome at least two of these drawbacks, i.e. the application cost and duration, without degrading the measurement accuracy.

For this purpose, according to the invention, an inspection device according to claim 1 is proposed.

The invention is advantageously completed by the features of claims 2-11.

The invention also relates to a method for applying a device according to the invention.

For this purpose, an inspection method according to claim 12 is proposed according to the invention.

The present invention has many advantages.

The invention only requires little specific hardware. No provision is made for heavy and bulky supporting means or for means for displacing the image sensor.

Indeed, the function of supporting the fuel assembly (on which an inspection device is removably fastened according to the invention) during the taking of snapshots is performed by the bridge, which is a piece of equipment already present in a nuclear plant.

Further, the means for displacing the image sensor are formed by the lowerator, which is a piece of equipment already present in a nuclear plant.

The boom bearing the reference graduation of the device is, as for it, lightweight and not very bulky.

The device is assembled and disassembled rapidly (about 4 hrs). The device may be installed in less than one hour, since its handling is easy: the boom is lightweight and mobile, and removable fastening of the boom on the assembly is carried out within a few minutes. This removable fastening is facilitated by the use of a float, which facilitates placement of the boom on the assembly, but which also makes the boom free of any tie since it floats when it is not fastened to the assembly.

With the fastening accuracy of the boom on the assembly (1-2 mm), good accuracy of the measurements may be obtained.

It is easily decontaminated.

It is inexpensive.

The snapshots are taken rapidly, so that the assemblies are only immobilized for a short time. Indeed, in order to take a snapshot, it is sufficient to lift the assembly out of its cell by means of the grapnel and to place it in front of the shooting device (at a distance of the order of 2 m). During the shooting, the assembly is always immersed in the pool, but is suspended from the bridge. Each assembly is thus immobilized for less than four hours for a total number of shooting points of about 850 (on the four faces of the assembly).

The measurements are conducted off-line, and directly on the snapshots of the assembly and of the reference graduation, which increases the accuracy of the measurements. Indeed, because the means for displacing the image sensor are formed by the lowerator of the pool, the measurement based on displacement counters is no longer possible.

On the other hand, the preliminary calibration phase is suppressed, which means additional gain in the time for taking snapshots. Further, as the measurements are conducted off-line on the snapshots, and no longer directly by displacing the camera, the immobilization time of the assembly in the pool is strongly reduced: it in fact boils down to the time for taking sequences of snapshots.

The device allows complete inspection of the assembly. With it, it is notably possible to determine easily and directly:
the distance between the end pieces,
the distance between the peripheral rods and each end piece,
the length of the peripheral rods,
the height of the springs of the upper end piece,
the offset distance between the end pieces,
the altitude of each grid,
the deflection of each grid,
the width of each grid, and
the space between the rods.

The measurements accuracies are of the order of plus or minus 1 mm for large distances (from 4-5 m) and of plus or minus 0.25 mm for small distances (less than 100 mm). This is made possible by the use of a high precision image sensor (a digital camera instead of a camera with lower resolution associated with displacement counters as in the prior art).

Taking of snapshots on the irradiated assemblies is ensured in the pool at combustion rates which may exceed 60 GWd/tU: protection against irradiation is ensured by a thickness of borated water of more than 2 meters between the device and the fuel assembly suspended from the bridge.

The snapshots may be taken down to a depth of 12 meters, in borated water, at temperatures comprised between 15° C. and 50° C.

BRIEF DESCRIPTION OF THE DRAWINGS

Other features, objects and advantages of the invention will become apparent from the following description, which is purely illustrative and non-limiting, and which should be read with reference to the appended drawings wherein.

In all the figures, similar elements bear identical numerical references.

DETAILED DESCRIPTION OF THE INVENTION

Figure 1:
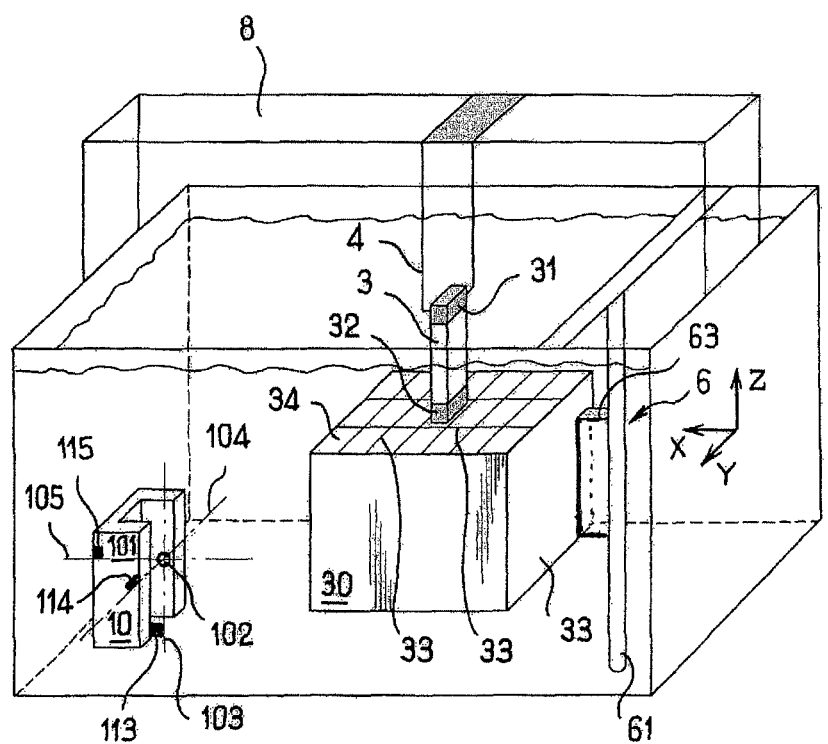
FIG. 1, on which comments have already been made, schematically illustrates a pool of a nuclear plant containing fuel assemblies and a known inspection device.
Figure 2:
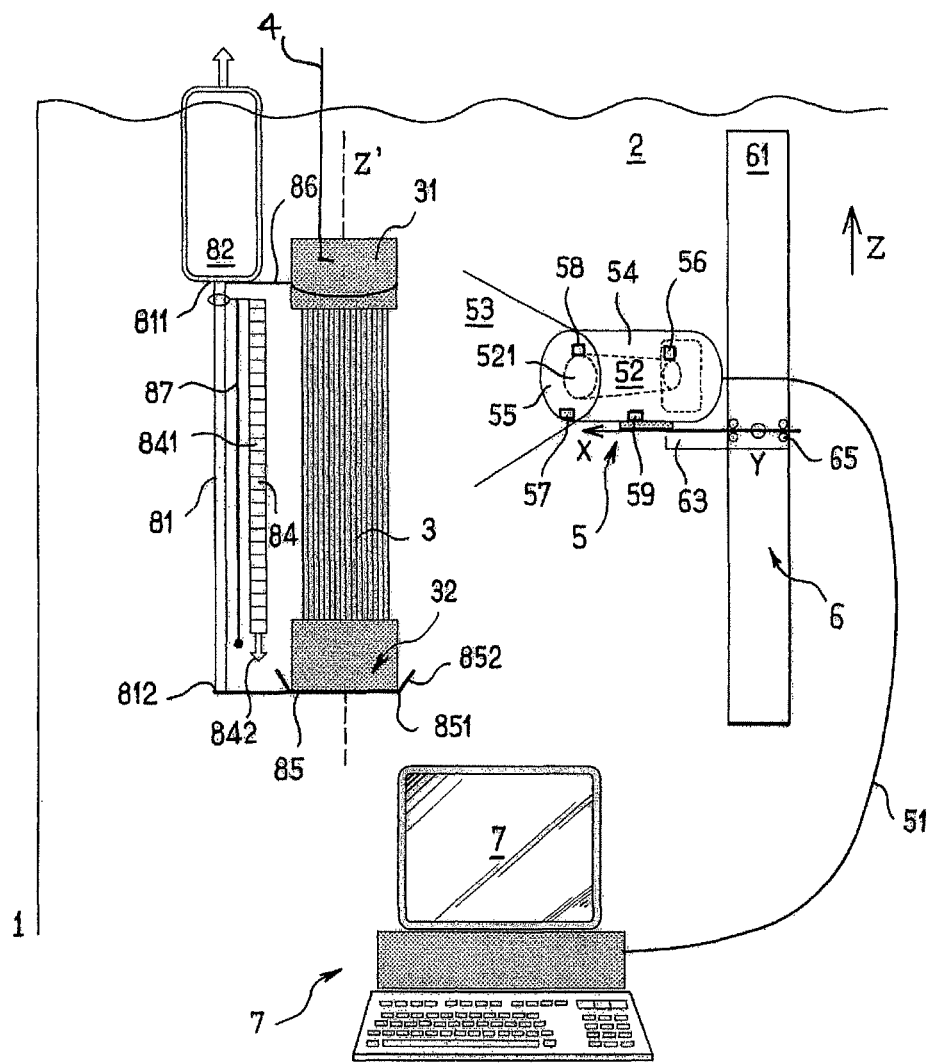
FIG. 2 schematically illustrates a device according to the invention.

FIG. 2 schematically illustrates a possible example of a device for inspecting a fuel assembly 3 in a pool 1 of a nuclear plant.

The device mainly includes an image sensor 5 and a boom 81.

The sensor 5 includes a field of observation 53.

The boom 81 includes at least one removable fastener to the assembly 3, and a reference graduation 84 extending along an axis Z parallel to a longitudinal axis Z' of the assembly 3. The graduation for example consists of located divisions with a gap of the order of 1 mm for example. Other gap values may of course be provided. Preliminary metrology enables the position of certain reference divisions to be known with high accuracy (±0.2 mm).

The boom 81 is removably fastened by fastening means 85 and 86, on the assembly 3, so that the image sensor 5 may observe in its field 53, both the boom 81 and the assembly 3.

As shown by FIG. 2, the boom 81 is removably fastened onto the assembly 3, while the assembly 3 is borne by a grapnel 4 of a bridge and suspended from the bridge at an intermediate depth in the pool 1. Thus, with the invention, it is possible to do without heavy and bulky supporting means: the support of the assembly is ensured by the grapnel 4, already present in the installation.

Fastening of the boom 81 onto the assembly is carried out with an accuracy from 1-2 mm.

The measurement principle consists of determining, for each end of the large distances to be measured (for example the distance between the end pieces, the offset between the end pieces, the altitude of a grid of the assembly, etc.), the distance between this end of the assembly and a division of the graduation 84, parallel to the distance to be measured. For small distances to be measured (for example the distance between a rod and each end piece, the height of a holding spring, the deflection of the grid, the width of the grid or the space between two rods for example), the measurement is directly conducted on a single snapshot, the magnification of the image being determined by a portion of the graduation located in the snapshot taking field 53.

To do this, the image sensor 5 acquires a snapshot with high magnification and high definition, with the end of the distance to be measured on the one hand, and the closest division of the graduation 84 on the other hand, in its field of observation 53.

The measuring technique is then carried out off-line on the snapshot, by means of processing and control means 7 described in more detail in the following of the present description.

Preferably, the image sensor 5 is a digital still camera 52 with automatic focussing, provided with a motorized telephoto lens 521 with variable focal length. Very preferentially, the camera 52 is comprised in a sealed cylinder 54 (up to 10 bars) equipped on the front face with an optical glass 55. The cylinder 54 also includes a digital still camera 56 mounted on the viewfinder of the camera 52, a pressure sensor 57 for locating the altitude of the sensor 5, a lighting projector 58 and a spirit level 59 for adjusting the horizontality of the sensor 5.

The image sensor 5 is mounted on a table 630. The table 630 is mounted on a basket 63, itself mounted on a generally vertical rail 61 parallel to the longitudinal axis Z' of the assembly 3. The rail 61 and the basket 63 are part of a standard piece of equipment of the pool called a lowerator 6. The basket 63 may thus move on the rail 61 by the displacement means 65. The inspection device is therefore considerably simplified and made lightweight relatively to the device of the prior art. Provision is not made for specific means for displacing the sensor.

The table 630 is capable of displacing the sensor 5 along several axes. Thus, the table 630 may displace the sensor 5 in a plane XY perpendicular to the axis Z (in other words along a horizontal axis parallel to the face of the assembly) on the one hand, and around an axis Y perpendicular to the Z axis (in order to be able to adjust the horizontality of its optical axis) on the other hand.

Generally, the grapnel 4 places the assembly 3 and therefore the boom 81, at a distance of about 2 meters from the lowerator 6 bearing the sensor 5.

The boom 81 for example consists of a set of sections of booms, assembled with accuracy, being used as a framework. It includes two ends, an upper end 811 and lower end 812 respectively.

The lower end 812 is connected to a removable fastener 85 to the assembly. The fastener 85 includes a receptacle 851 of the base 32 of the assembly 3. The receptacle 851 substantially has a complementary shape of the base 32, with edges 852, so that once it is in place, the fastener 85 is relatively stable, but always removable. Because of the shape of the receptacle 851, placement and removal of the fastener 85 are easy.

At a suitable intermediate altitude, the boom 81 is equipped with a fork 86 capable of being removably fastened to a top 31 of the assembly. Similarly to the receptacle 851, the fork 86 substantially has a complementary shape of the top 31. The fork 86 is placed and removed easily, while being relatively stable once it is placed. The position of the fork 86 relatively to the boom 81 is adjustable and consequently the device may be adapted to different lengths of assemblies such as for example 4 m (900 MW) of 5 m (1,300 MW).

The upper end 811 is further preferentially connected to a float 82 which balances the weight of the boom 81, which facilitates handling of the boom, while exerting a slight vertical thrust ensuring its hold on the assembly. The float 82 also allows floating of the boom 81 in the pool 1 when it is no longer fastened to the assembly 3 once the measurements have been conducted.

Preferably, the graduation 84 includes a tape measure 841 ballasted with a weight 842.

The boom 81 also preferentially includes a plumb line 87.

It is recalled that the device includes processing and control means 7. The means 7 allows processing of the snapshot acquired by the image sensor 5. They also include a digital transmission chain 51 between the camera 52 and the processing and control means 7. The chain 51 is for example a USB type wire connection. The processing and control means 7 are for example a microcomputer.

The means 7 are preferentially equipped:
with software for controlling the camera 52 (generally provided with the camera 52),
with a control interface for the table 630 and the projector 58,
with snapshot software allowing import, viewing, naming and memory storage of all the snapshots required for the complete metrology of the assembly 3,
with measurement software allowing all the measurements to be conducted from metrologies obtained on the snapshots acquired earlier,
with software for formatting the measurement results (measurement report) and for technically controlling the measurements.

All the measurements are conducted by metrology on an image, by measuring in pixels the distance between the target on the assembly and the graduation. The calibration of the magnification of the photograph is carried out directly by proportionality, from the graduation which is in the field. Therefore, there is no preliminary calibration.

The invention claimed is:

1. A device for inspecting a fuel assembly containing a plurality of fuel rods in a pool of a nuclear plant equipped with a grapnel for displacing and suspending the assembly in the pool, comprising:
a moveable image sensor including a field of observation, and
a boom including a reference graduation extending along an axis parallel to a longitudinal axis of a fuel assembly containing a plurality of fuel rods, so that upon suspending the fuel assembly in the pool by the grapnel, the image sensor may observe in its field both the boom and the assembly, and the boom hangs in the pool beside the fuel assembly so as not to occupy the bottom of the pool, removable fastening means for fastening the boom on the assembly so as to maintain the assembly at a stationary position, wherein the assembly is supported and suspended in the pool by the grapnel at a stationary position while the image sensor is moving.

2. A device according to claim 1, wherein the boom comprises two ends, and the removable fastening means comprises a receptacle of a base of the assembly, connected to at least one end of the boom.

3. A device according to claim 2, wherein another end of the boom is fastened to a float.

4. A device according to claim 2, wherein the fastening means comprises a fork capable of being removably fastened to a top of the assembly.

5. A device according to claim 1, wherein the graduation comprises a tape measure ballasted with a weight.

6. A device according to claim 1, wherein the image sensor is a still camera.

7. A device according to claim 6, wherein the still camera is a high definition digital still camera provided with a motorized telephoto lens.

8. A device according to claim 6, further comprising
means for processing and controlling the images acquired by the image sensor, and
a digital transmission chain between the still camera and the processing and control means.

9. A device according to claim 1, wherein the image sensor is mounted on a table capable of displacing the sensor in a plane perpendicular to the axis parallel to the longitudinal axis of the assembly on the one hand, and around an axis perpendicular to the axis parallel to the longitudinal axis of the assembly, on the other hand, in order to be able to adjust horizontality of the sensor.

10. A device according to claim 1, wherein the image sensor is mounted on a basket mounted on a rail parallel to the longitudinal axis of the assembly, the basket being capable of displacing the sensor parallel to the longitudinal axis of the assembly.

11. A device according to claim 10, wherein the basket and the rail are part of a lowerator.

12. A method for inspecting at least one fuel assembly in a pool of a nuclear plant, equipped with a grapnel for displacing and suspending the assembly in the pool, comprising:
mounting a moveable image sensor including a field of observation, in proximity to the assembly containing a plurality of fuel rods, said method being characterized in that it further includes steps according to which:
removably fastening a boom including a reference graduation and extending along an axis parallel to a longitudinal axis of the assembly to the assembly, such that when the assembly is suspended in the pool by the grapnel, the boom hangs in the pool beside the fuel assembly so as not to occupy the bottom of the pool, and
observing via the image sensor both the boom and the assembly in its field while the assembly is suspended by the grapnel.

* * * * *